Figure 7:
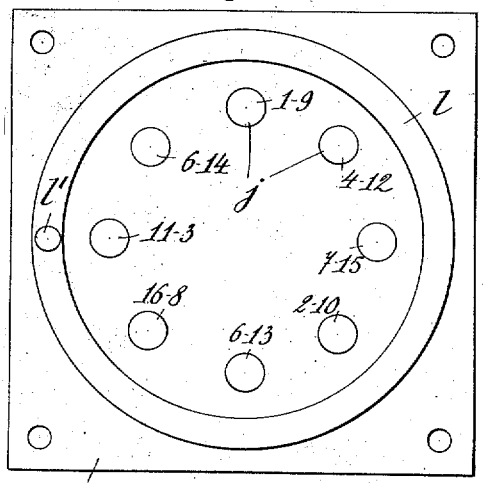

P. MATTHIJSSEN.
CARD PUNCHING MACHINE.
APPLICATION FILED JULY 12, 1909.
986,479.
Patented Mar. 14, 1911.
8 SHEETS—SHEET 1.
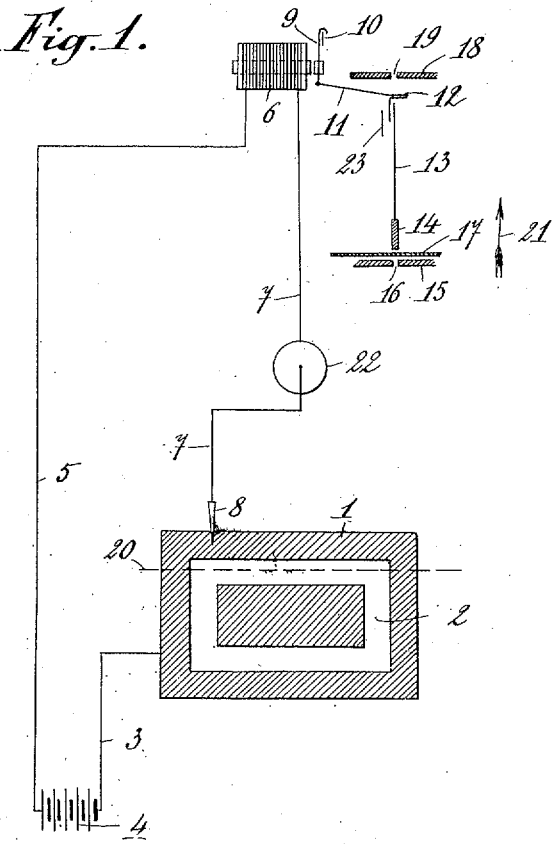
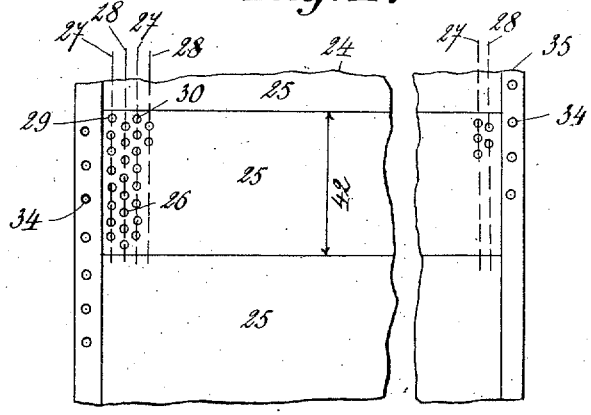

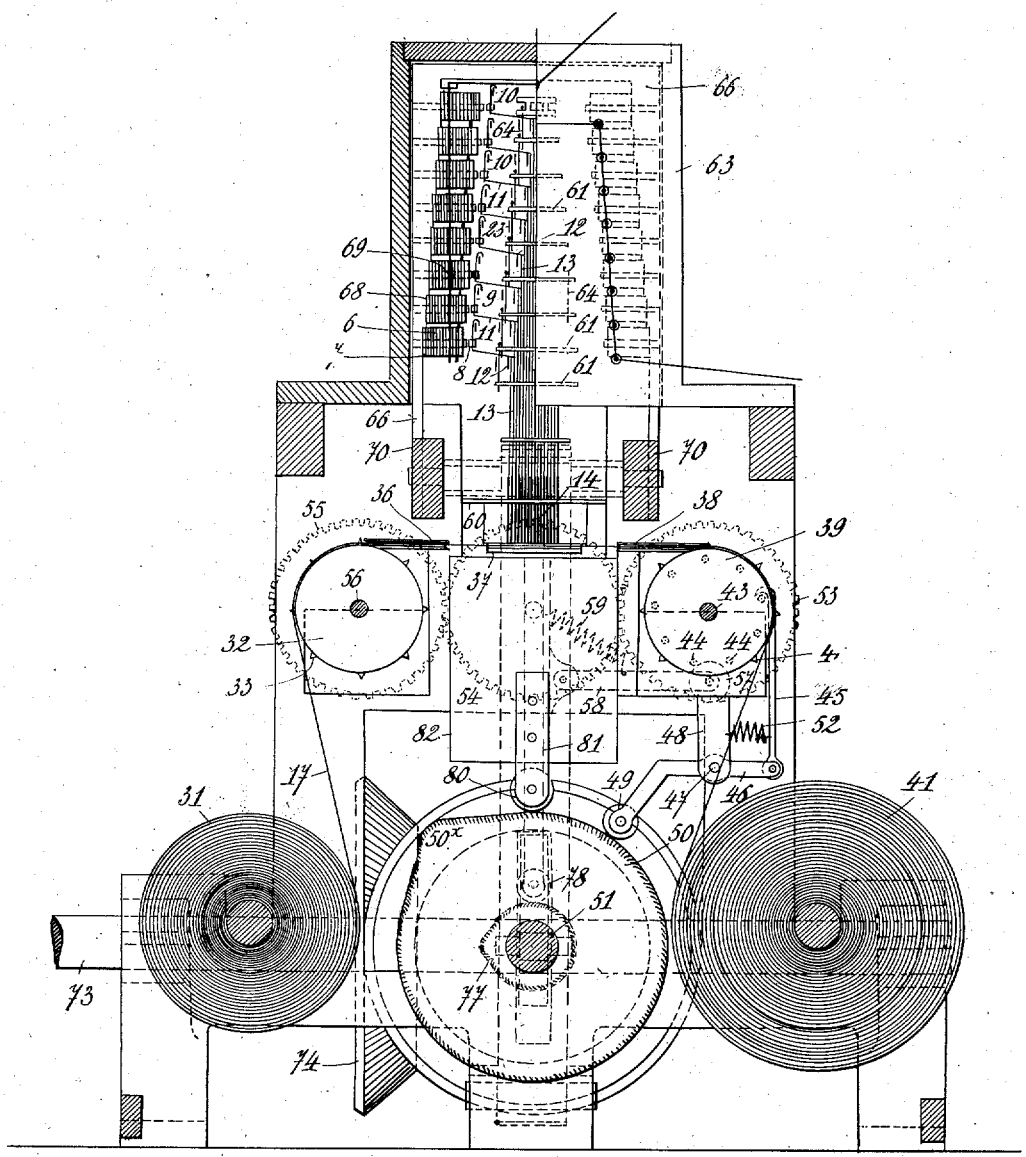

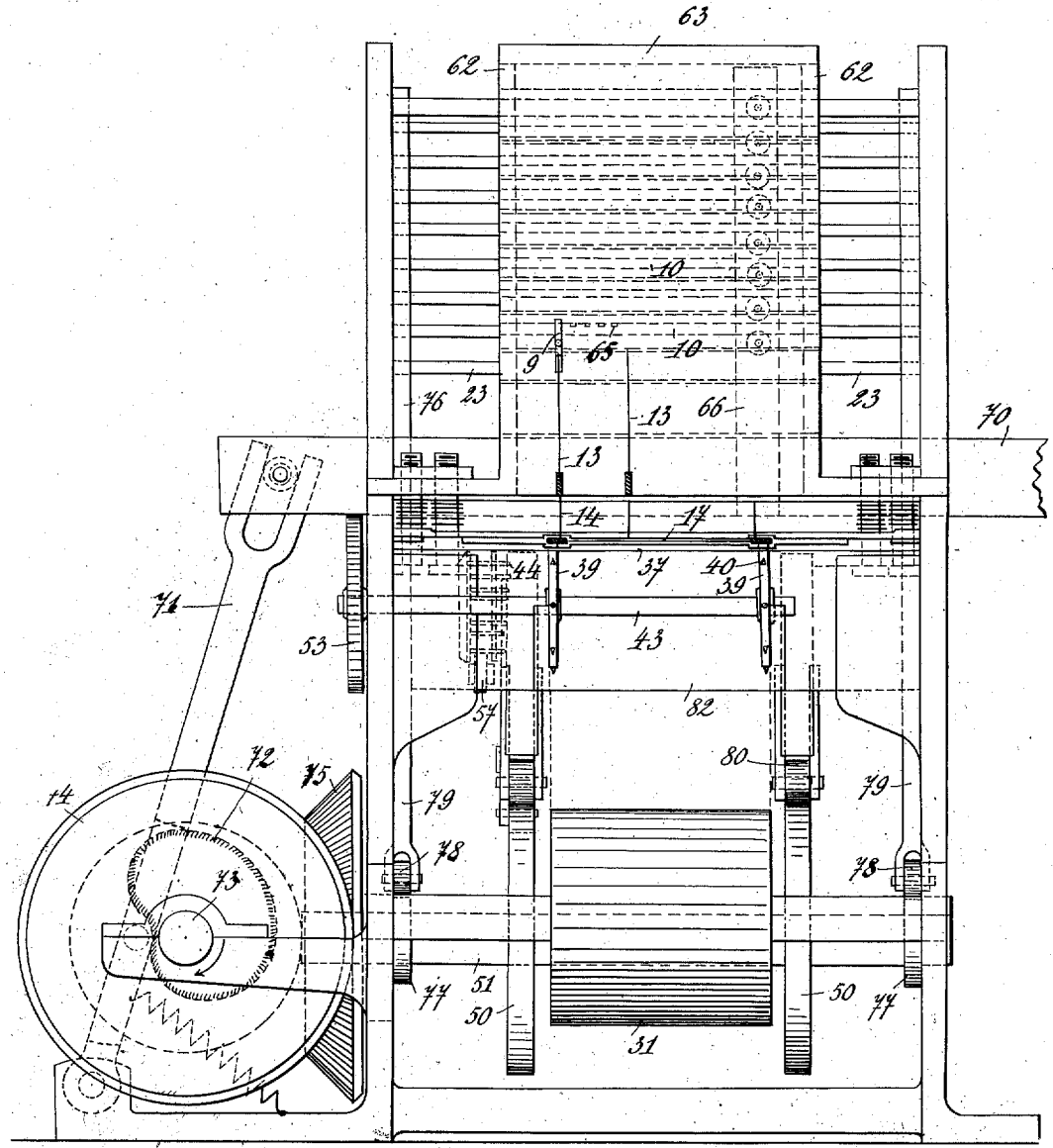

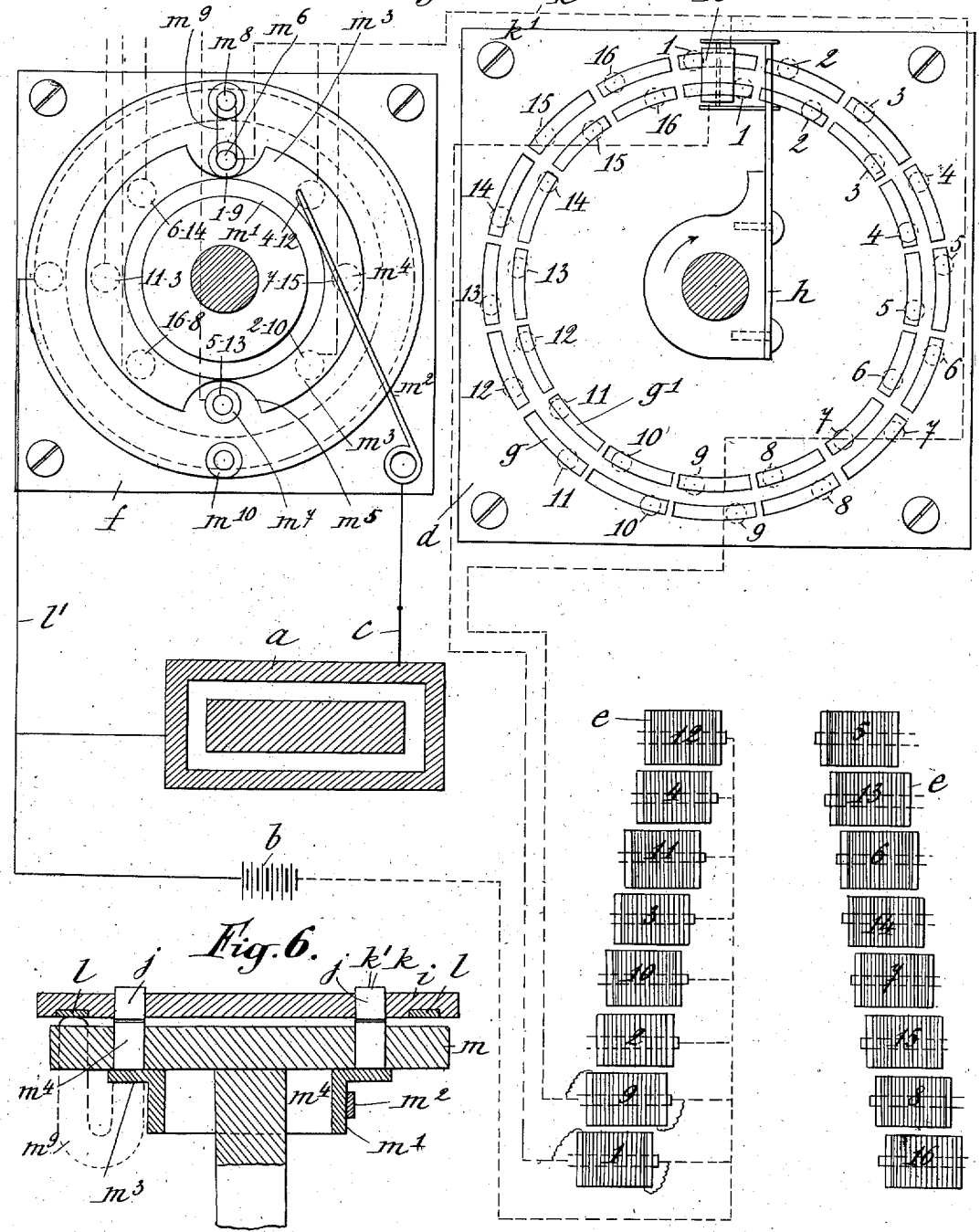

P. MATTHIJSSEN.
CARD PUNCHING MACHINE.
APPLICATION FILED JULY 12, 1909.

986,479.

Patented Mar. 14, 1911.

8 SHEETS—SHEET 5.

WITNESSES
W. P. Burk
John A. Percival

INVENTOR
Pieter Matthijssen
By Wm Wallace White
ATTY.

P. MATTHIJSSEN.
CARD PUNCHING MACHINE.
APPLICATION FILED JULY 12, 1909.

986,479.

Patented Mar. 14, 1911.

8 SHEETS—SHEET 6.

INVENTOR
Pieter Matthijssen
BY Wm Wallace White
ATTY.

WITNESSES
W. P. Burk
John A. Percival

P. MATTHIJSSEN.
CARD PUNCHING MACHINE.
APPLICATION FILED JULY 12, 1909.

986,479.

Patented Mar. 14, 1911.
8 SHEETS—SHEET 7.

WITNESSES
W. P. Burke
John G. Percival

INVENTOR
Pieter Matthijssen
By Wm Wallace White
ATTY

P. MATTHIJSSEN.
CARD PUNCHING MACHINE.
APPLICATION FILED JULY 12, 1909.

986,479.

Patented Mar. 14, 1911.

8 SHEETS—SHEET 8.

WITNESSES
W. P. Burk
John A. Percival

INVENTOR
Peter Matthijssen
By Wm Wallace White
ATTY.

UNITED STATES PATENT OFFICE.

PIETER MATTHIJSSEN, OF EINDHOVEN, NETHERLANDS.

CARD-PUNCHING MACHINE.

986,479.

Specification of Letters Patent.  Patented Mar. 14, 1911.

Application filed July 12, 1909. Serial No. 507,207.

*To all whom it may concern:*

Be it known that I, PIETER MATTHIJSSEN, a subject of the Queen of the Netherlands, residing at Eindhoven, in the Kingdom of the Netherlands, have invented new and useful Improvements in Card-Punching Machines, of which the following is a specification.

This invention relates to an improved machine for punching cards for weaving looms and has for its purpose to secure a machine in which the said punching operation is automatically and directly effected according to any given pattern or design which is to be reproduced by the weaving operation. This machine makes use as other similar machines, of a metallic plate, galvano or other similar reproduction of the pattern to be woven, coöperating with a contacting needle or style and with an electric circuit comprising one or more electromagnets actuating the perforators or punches but is especially distinguished from the old machines of the same class by a reduced number of electromagnets and coöperating elements and by the simplicity of its construction.

To this end, the invention consists in special combinations and arrangements of the several coöperating parts of the machine as will be hereinafter fully described and pointed out in the appended claims.

Referring to the annexed drawings: Figure 1 is a diagrammatic view of an electric circuit including one of the operating elements of the machine. Fig. 2 is a side view, partly in section of a machine embodying the invention. Fig. 3 is a front view of the machine shown in Fig. 2. Fig. 4 shows separately a punched card as obtained with the machine shown in Figs. 2 and 3. Figs. 5 to 19 show diagrammatically the construction and also the connections of various switches or current distributers adapted to be used in conjunction with the improved machine, and certain weaving diagrams hereinafter referred to.

According to the invention is made use of a metallic plate carrying a reproduction of the pattern, or design which is to be woven, for instance of a galvano or electrotype such as can be obtained by any well-known photographic process, the recessed portions of said metallic plate being covered with any appropriate insulating or non-conducting material such for instance as gelatin, shellac or any other material having equivalent properties. With the said metallic plate coöperates a contacting needle or style which is included in an electric circuit with an electromagnet actuating a punch or perforator in such a manner that the contact of said style with the metallic parts or raised portions of the plate results in the closing of the electric circuit through the electromagnet which is thus caused to put the corresponding punch out of action or to unlock the same. On the contrary, when the contacting needle or style rests on a part of the metallic pattern or galvano which is covered with insulating or non-conducting material, the circuit remains interrupted through the electromagnet and said electromagnet remains without any action upon the corresponding punch which is then locked and adapted to punch a hole in the card.

The several operating elements just described are shown in Fig. 1 in which 1 designates the metallic plate carrying the copy or reproduction of the pattern or design which is to be woven. The recessed portions 2 of said metallic plate are supposed to be covered with a suitable insulating material. The metallic part of the plate 1 is connected by a wire 3 to one pole of a battery 4, the second pole of which is connected by a wire 5 to one end of the winding of an electromagnet 6; the second end of said winding is connected by a wire 7 to a contacting needle or style 8 which is adapted to be displaced over the surface of the galvano or design-carrying plate 1. The iron-core of the electromagnet 6 is placed in front of a little armature of soft iron fixed to a supporting hook 9 which is suspended from a bar 10. To the lower end of the supporting hook 9 is pivoted a bar 11 having at its opposite end a plate or stop 12 resting normally upon a needle 13 having its lower end fixed to a punch 14 placed above a table 15 which is provided with a hole 16 adapted to give passage to the punch 14. The paper 17 of the card which is to be punched, passes over the table 15 and a plate 18 is placed above the needle 13 and is provided with a hole 19 for the passage of the needle 13 when said needle is lifted after having been released or unlocked by the stop 12 of the pivoted bar 11.

The principle of the machine will be readily understood from the above description: If it be assumed that the contacting needle or style 8 moves along a line such as 20 over the plate 1, the said style will pass successively upon metallic portions of the plate and upon other portions conveniently covered with the insulating material 2. When the style rests upon a non-protected or blank portion of the plate, the circuit of the battery 4 is closed through the winding of the electromagnet 6. The armature-hook 9 will consequently be attracted and the stop 12 at the end of the pivoted bar 11 will be withdrawn from the top of needle 13. On the contrary, when the style 8 passes upon a protected or insulated portion 2 of plate 1, the electromagnet 6 remains out of action and the stop 78 rests upon the top of needle 13. In the first case, if the table 15 over which the paper 17 is conducted, is lifted in the direction of the arrow 21, the needle 13 resting by the punch 14 upon the paper 17, will be lifted with said paper and will pass freely through the hole 19 in the plate 18 without punching the paper 17. In the second case, that is to say if the electromagnet remains out of action, the stop 12 resting on the top of the needle 13 will be lifted together with said needle on the lifting of table 15. The bar 11 will then be pivoted on the end of the armature-hook 9 and the stop 12, being thus brought before the hole 19 of plate 18,, will prevent the passage of the needle 13 through said hole. The needle 13 and also the punch 14 will thus be prevented from being further lifted and during the lifting movement of table 15, the punch 14 will punch a hole through the paper while passing through the hole 16 of table 15.

It will be readily understood that the above described elements can be arranged so as to automatically operate all the punches 14 which could be required for the complete punching of the card 17. To this end, it will be necessary to provide a number of punches 14 and needles 13 corresponding to the number of holes which are required in the card or, in other words, corresponding to the number of needles or lifting-wires of the jacquard. A convenient and simple arrangement would consist for instance in combining with each needle 13 a stop 12 pivoted by a bar 11 at the end of an armature-hook 9 and, in providing in front of each armature, an electromagnet 6 as shown in Fig. 1. In this case in order to successively operate each punch 14 it would be necessary to make use of a switch or current distributer, the position of which is shown at 22 Fig. 1. The said switch would successively close the circuit of the battery through each of the electromagnets 6 in such a manner that after each stroke of the style 8 over the metallic plate 1, that is to say after a passage of the style 8 upon the plate 1 corresponding to line 20 for instance, all the electromagnets 6 would have been successively energized or would have been left without current according to the metallic portions or insulated portions of the plate which have been in contact with the style 8. Then after each stroke of the style it would be sufficient to lift the table 15 in order to punch the paper 17 on the whole surface which is worked at a time. After the punching, the paper could be fed conveniently while, at the same time, a bar 23 (Fig. 1) having an up and down movement, would act upon the incline of the pivoted bars 11 so as to replace the stops 12 in their position above the top of the needles 13. According to one feature of the invention however the number of electromagnets 6 can be considerably reduced and need not correspond to the number of punches which are to be put in action. Indeed, on considering a card such as 24, shown in Fig. 4, it will be observed that each of the surfaces 25, corresponding to one of the faces of an ordinary card-cylinder, must be provided with a number of holes 26 sufficient to simultaneously operate all the needles or lifting wires of the jacquard; the said holes 26 are arranged in a succession of rows 27 and 28 which are alternately repeated upon the length of the surface 25. As an example it may be stated that in a jacquard having 448 lifting-wires, each card of the card-chain or each surface 25 of the card 24 can be provided with 448 holes which are divided into 28 rows 27 of holes and 28 rows 28 having each 8 holes (Fig. 4).

The number of punches 14 will necessarily correspond to the number of holes but it will be easily understood that a given electromagnet, after having coöperated with the punch corresponding to the first hole 29, of the first row 27 can be used, after an interval of time in conjunction with the punch corresponding to the first hole 30 of the second row 27 provided that said electromagnet be conveniently displaced so as to be placed in front of the armature-hook 9 corresponding to said punch. A similar displacement of the electromagnet 6 can be effected for each first hole of each row 27, on the length of the surface 25, and also for each second hole of the same rows and so on in such a manner that 448 holes, divided into 28 pairs of rows comprising 16 holes in each pair of rows, will only require 16 electromagnets conveniently distributed or arranged so as to first coöperate with the armature-hooks of the punches corresponding to the two first rows of holes, then with the armature-hooks of the punches corresponding to the two following rows of holes and so on, along the whole length of the card. The machine shown in Figs. 2 and 3 is constructed on the above lines.

The paper 17 is carried by a drum 31, passes on two wheels 32 provided with pegs 33 acting in holes 34 (Fig. 4) provided in the edge 35 of the paper and is then conducted between guides 36 and over a table 37 having an up and down movement and corresponding to the table 15 already described with reference to Fig. 1. The paper is then conducted between guides 38, passes over two wheels 39 provided with pegs 40 and is rolled again on a drum 41. The paper is fed gradually over the table 37, each feed corresponding to the width of the surfaces 25, each of which represents a card of the card-chain. The said feed can be produced by any suitable means for instance as follows: The wheels 39 are mounted on a shaft 43 provided with a disk having laterally projecting pins 44 which are acted upon by a hook 45 pivoted on the end of a lever 46 adapted to oscillate at 47 in a fixed bearing 48; said lever 46 is provided with a roller 49 resting upon a cam 50 mounted on a shaft 51. The hook 45 is held in engagement with the pins 44 by a spring 52. When the boss $50^x$ of cam 50 acts on the roller 49, the hook 45 pulling on pin 44, with which it is in engagement, causes the shaft 43 to be partially rotated, thus causing a corresponding feed of the paper 17. The rotation of the shaft 43 is transmitted by gear-wheels 53—54 and 55 to the shaft 56 carrying the paper-feeding wheels 32 and in order to secure a regular and uniform displacement of the paper, each partial rotation of the shaft 43 is strictly limited by the action of a locking roller 57 which is engaged between two consecutive pins 44 and is supported by an oscillating bar 58 which is acted upon by a spring 59.

The paper-punching mechanism is mounted above the table 37 and comprises the punches 14 already described with reference to Fig. 1; said punches are arranged in rows so as to correspond to the position of the holes shown in Fig. 4. In other words the said punches are arranged in rows and each row comprises eight punches; the punches of the first row are followed by the punches of a second row which are placed in the intervals between the punches of the first row; the punches in the third row are in line with the punches in the first row and the punches in the fourth row are in line with the punches of the second row and so on along the whole length of the machine. As it has been supposed that the paper must be provided with a maximum of 448 holes for each surface of the card cylinder, it will be necessary to provide 448 punches 14 arranged in 28 pairs of rows having each 8 punches. The said punches are guided by a plate 60 suitably perforated and forming a kind of grid; each punch has a corresponding needle 13 and said needles pass through guiding plates 61, also suitably perforated and forming a kind of grid and which are supported at both ends in the side-walls 62 (Fig. 3) of a box 63 containing the mechanism. To each needle 13 corresponds a stop-plate 12, as already described, which is carried by a bar 11 pivotally connected to the end of an armature-hook 9. The several bars 11 are spaced from one another by pins 64 placed between the guiding-plates or grids 61. The supporting bars 10 for the armature hooks 9 are supported at their ends in the walls of box 63; the said bars are provided with notches 65 (Fig. 3) adapted to conveniently space the armature-hooks 9 from one another and to secure the same in proper position. Two vertical supports 66 are placed in the box 63 and the electromagnets 6 are carried thereon. The said electromagnets are sixteen in number and are suitably arranged so as to "lock" or unlock the punches 14 in the order in which the punching of the holes is to be effected. In other words, the lowermost electromagnet 67, for instance, is placed in front of the armature hook 9 corresponding to the first punch 14 which has to punch the first hole 29 of the first row of holes 27.

The second electromagnet 68 is placed in front of the armature hook 9 corresponding to the first hole of the second row of holes 28 while the third electromagnet 69 corresponds to the punch for the second hole of the first row 27. The drawing shows clearly that the order of location of the electromagnets is in accordance with the regular order of the holes forming each pair of rows of holes 27 and 28. However, as the sixteen electromagnets, after having acted upon the punches 14 corresponding to a first pair of rows of holes, 27 and 28, must act upon the punches of the second pair of hole-rows, and so on, it is necessary to give them a regular and uniform translating movement corresponding to the movement of the style 8 over the metallic plate 1. To this end, the vertical supports 66 of the electromagnets are carried by two beams 70 to which a regular movement is transmitted by a lever 71 acted upon by a cam 72 securing the uniformity of movement of the supports 70 during a time-unit. Said cam 72 is mounted on the shaft 73 of the machine which drives through a pinion 74 a second pinion 75 mounted on the shaft 51 carrying the cam 50. The bars 23, returning the connecting bars 11 and the stops 12 in their original position above the needles 13 after each action of the machine, are carried, outside the box 63, by movable supports 76, suitably guided and adapted to be moved up and down by cams 77 mounted on the shaft 51 and acting upon rollers 78 which are carried by arms 79 fixed to the movable supports 76. The table 37 is moved up and down by a boss $50^x$ of cam 50 acting upon a roller 80 mounted on a slide 82 bodily connected with the table 37. The machine is further provided with a current distributer or switch, not shown in Figs. 2 and 3 but which will be described further in details and which corresponds to the switch 22 shown diagrammatically in Fig. 1. The said switch sends the current of the battery 4 successively in each of the electromagnets 6 while the style 8 is displaced over the metallic plate 1 of a given quantity which is determined by the number of pairs of hole-rows with which the card must be provided. In the example shown, said quantity corresponds consequently to 1/28 of the total stroke of the style 8 over the metallic plate as indeed the total length of the said plate is proportional to the length of the surfaces 25 of the card.

In order to obtain a strictly synchronous movement of the style 8 and of the electromagnets 6, the style can be fixed on one of the beams 70 controlling the movement of the electromagnets. The metal plate 1 can be fixed on the machine-frame and is adapted to be moved forward under the style after each stroke of said style. The plate could also be of cylindrical form and adapted to be displaced regularly under a fixed style according to well-known arrangements which need not be further described.

The machine acts as follows: At the beginning of a rotation of shaft 73, the electromagnets 6 are placed in front of the armature-hooks 9 corresponding to a first pair of rows of punches while simultaneously the switch sends the current successively in each of said electromagnets; after a partial movement, the electromagnets come in front of the armature-hooks 9 corresponding to the second pair of rows of punches 14 and so on, in such a manner, that for a rotation corresponding to 3/4 of a revolution of the shaft 73, the sixteen electromagnets pass successively in front of the total number of armature-hooks corresponding to the punches provided in the machine. Simultaneously the style 8 has effected a longitudinal stroke 20 over the metallic plate 1. When the electromagnets have reached the end of their stroke with the beams 70, all the stop-plates 12 of the needles 13 corresponding to the punches 14 which leave a blank in the card, have unlocked said needles while the others have been left in position above the top of the needles so as to lock them and to prevent their upward movement. At this moment, the boss 50× of cam 50 acts upon the roller 80 and lifts the table 37 together with the paper 17 which is punched by all the punches, which are locked by the closing of the holes 19 by the stop-plates 12. When the boss 50× has passed under the roller 80, the beams 70 return the electromagnets 6 in their original position during the last quarter of revolution of the shaft 73, while the boss 50× acting upon the roller 49 causes the feed of the paper 17 to take place; at said moment also the cams 77 acting upon the rollers 78 lift the bars 23 which, on acting on the pivoted bars 11, return to their normal position those of the stop-plates 12 which have been displaced. The machine is then ready for a second operation, that is to say for the preparation of the punching of the next card. Said preparation takes place, as already described, on a second displacement of the style 8 over the metallic plate in conjunction with the displacement of the electromagnets in front of the armature hooks 9 controlling the locking and unlocking of the punches 14. The machine operates consequently absolutely automatically and the punching operation is effected directly according to the galvano or electrotype or other reproduction of the design which is to be woven.

As it will be readily understood, the machine as above described only makes in the card the holes corresponding to the several portions of the metallic plate which are recessed and covered with insulating material so as to prevent the passage of the current. On the contrary such portions of the card which correspond to the metallic portions of the plate which are in contact with the style, are left blank or unperforated. Consequently to certain portions of the metallic plate, correspond portions of the card which are entirely perforated and to other portions of the metallic plate correspond other portions of the card which remain blank or unperforated and to such portions correspond the lifting and the lowering of all the warp threads of the woven fabric without providing in the perforated portions of the card a number of blanks and in the blank portions a number of holes corresponding to the bindings. The machine as described could therefore only be used for punching cards for manually operated looms in which, as is well-known, the binding threads or the groups of binding threads are lifted and lowered by means of harnesses separately actuated by a treadle motion.

Figure 11:
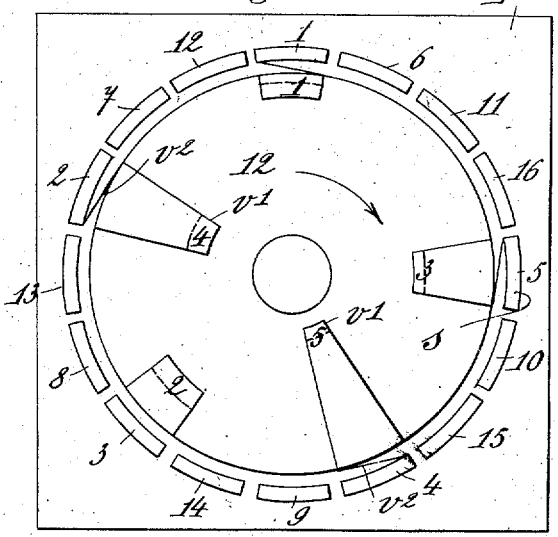
Figure 8:
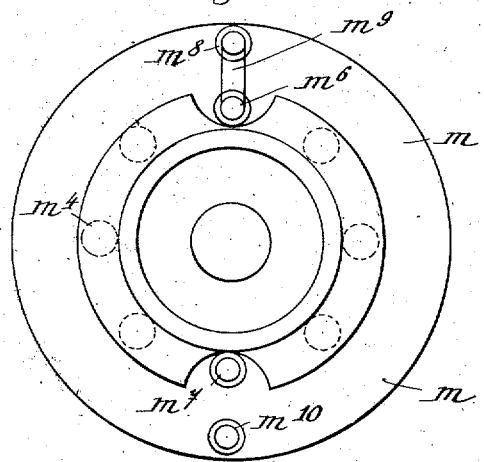
Figure 12:
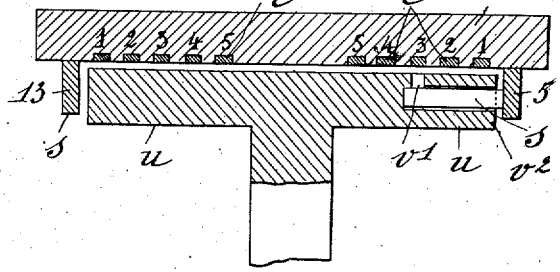
Figure 9:
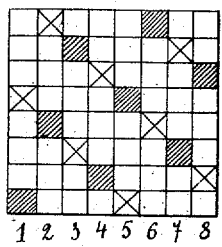
Figure 13:
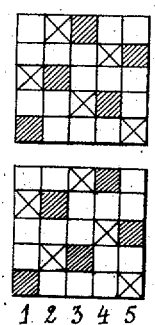
Figure 10:
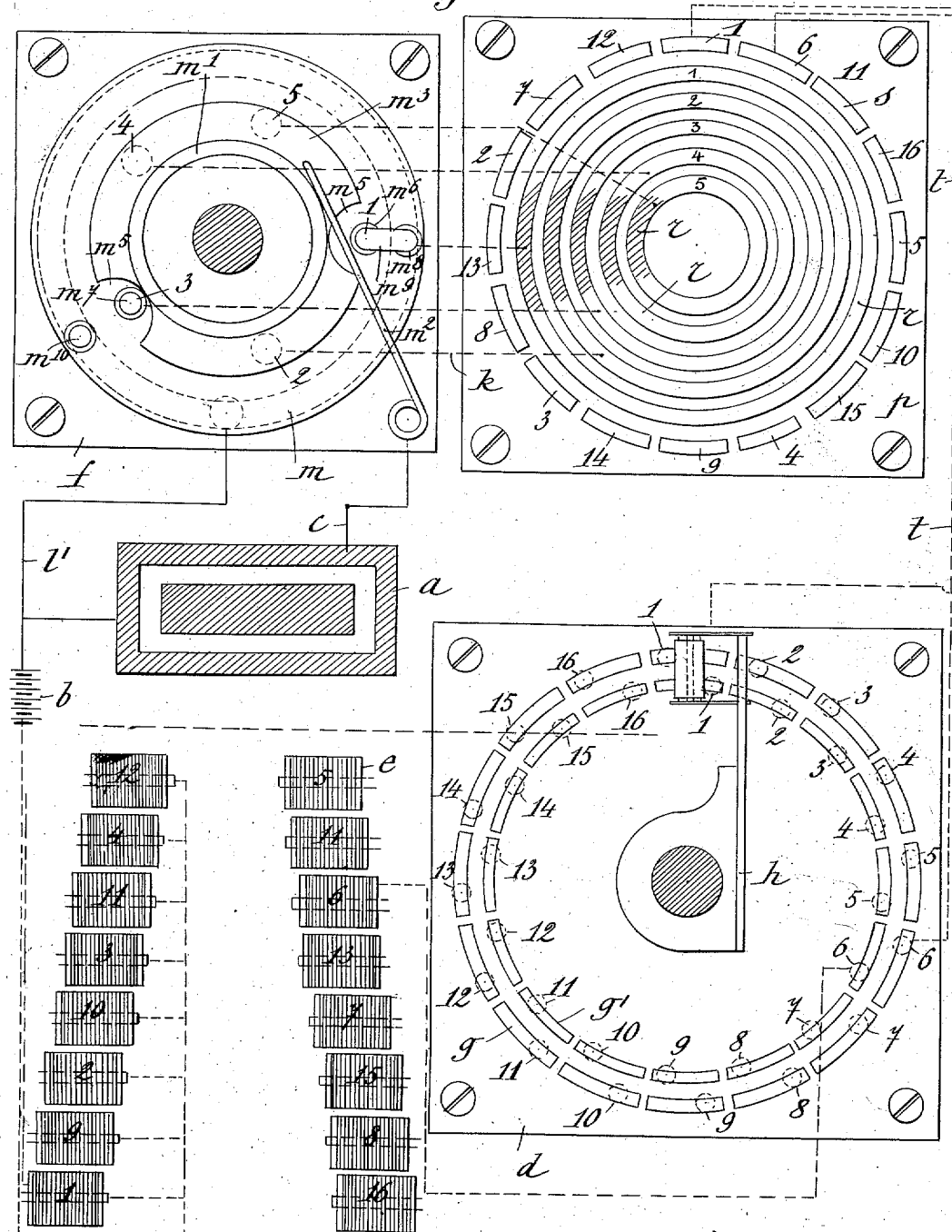
Figure 14:
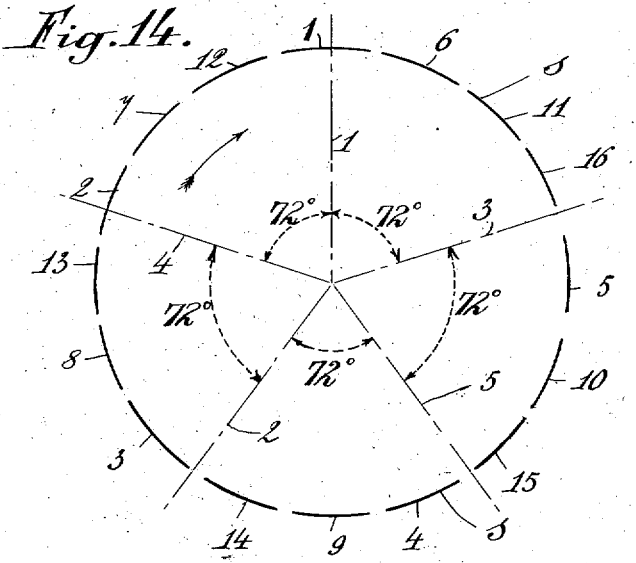
Figure 15:
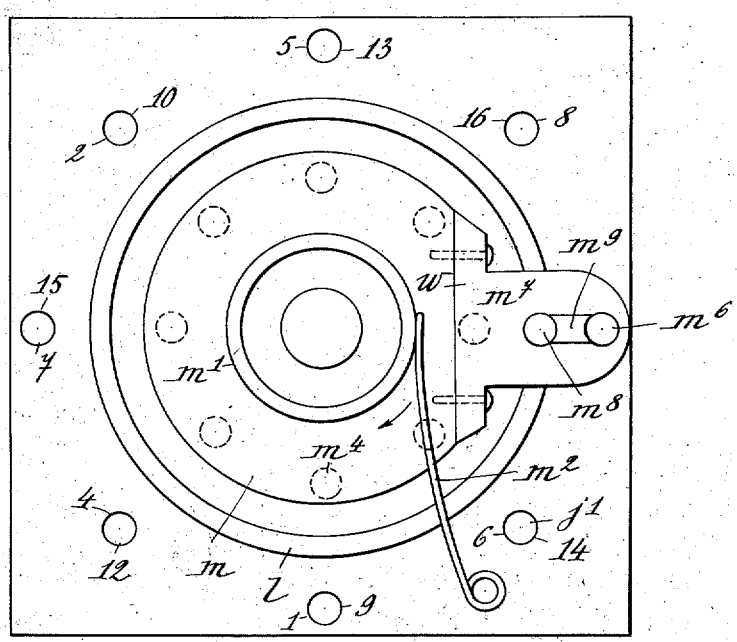
Figure 16:
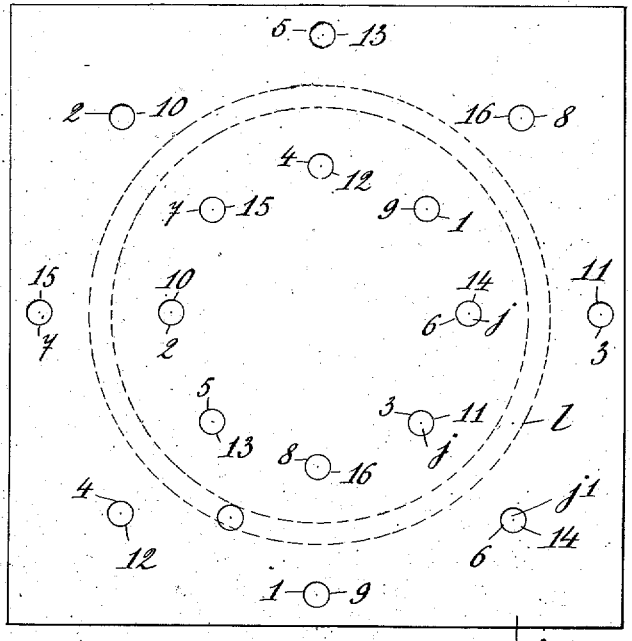
Figure 17:
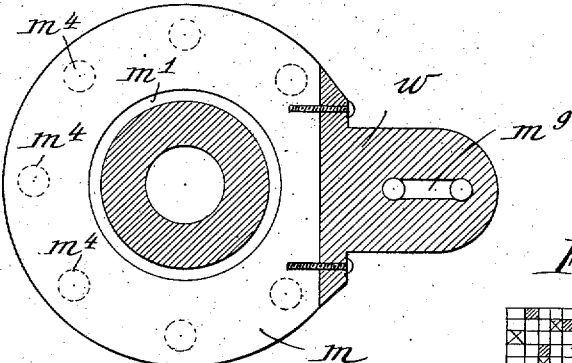
Figure 18:
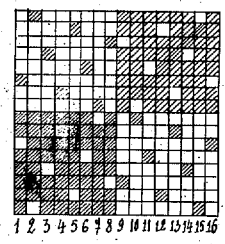

When the invention is to be applied to the punching of cards used in mechanically driven looms such harnesses cannot be used on account of the high tension of the warp threads and of the operating conditions of such looms which make impossible the use of separated harnesses for the binding threads. In this case it is necessary to provide in the card a number of holes and blanks corresponding to the bindings. In other words, when the style moving over the metallic plate closes successively the circuits of the electromagnets, it is necessary to provide special means preventing the action of certain of the electromagnets in such a manner as to punch the necessary holes to secure the lifting of the threads corresponding to the kind of binding which is to be obtained and, inversely, when the style is moving over an insulated portion of the metallic plate, it is necessary to provide for the action of certain of the electromagnets so as to prevent the punching of certain holes in the card. To this end it is necessary to combine with the current distributer or switch 22 (Fig. 1), one or more auxiliary switches securing a direct passage of the current to certain contacts of the main switch and interrupting permanently the passage of the current to other contacts according to the binding in such a manner that, whatever may be the distribution of the current resulting from the movement of the style over the metallic plate, certain electromagnets are permanently included in the circuit or permanently cut out of the circuit by the rotation of the main switch 22. Figs. 5 to 19 show different constructions of switches adapted for the purpose and also the construction of the main switch 22. Fig. 5 shows diagrammatically the connections in the case of a machine constructed as before described and provided with sixteen electromagnets having a uniform and regular translating movement corresponding to the movement of the style 8 over the metallic plate. Fig. 6 is a separate sectional view of the auxiliary switch. Figs. 7 and 8 are two views of details of said switch. Fig. 9 shows diagrammatically a kind of binding adapted to be produced with the switch arrangement of Fig. 5. Fig. 10 shows diagrammatically the general arrangement of the switch in the case of a binding affecting a number of threads different from the number of electromagnets. Figs. 11 and 12 are two views of details of a second auxiliary switch which is used in said arrangement. Fig. 13 shows the bindings secured by such an arrangement. Fig. 14 shows schematically a correction which is to be made in practice in the position of the pieces of contact of the switch shown in Fig. 11. Figs. 15, 16 and 17 show separately the elements of a third construction of auxiliary switch which is used to secure the binding shown in Figs. 18 and 19.

In Fig. 5, $a$ is the galvano or metallic plate (referred to by the numeral 1 in Fig. 1); $b$ is the battery (4 in Fig. 1), $c$ is the style (8 in Fig. 1) moving over the metallic plate; $d$ is the main switch (22 in Fig. 1), $e$ the electromagnets numbered 1 to 16 and $f$ the auxiliary switch.

As shown in Fig. 5, the main switch $d$ is provided with a number of double contacts ($g\ g'$) corresponding to the number of electromagnets $e$ and with a rotating arm $h$ having a contact $h'$ bridging successively, when it is rotated, two corresponding contacts $g\ g'$. The auxiliary switch $f$ is constructed as follows: A plate or disk $i$ (Fig. 6) is provided with a number of contacts $j$ (Fig. 7) (eight in the construction shown) to each of which two conductors $k\ k'$ are connected and lead to the contacts $g$ of the main switch $d$. The disk $i$ is further provided with a metallic ring $l$, embedded in the disk $i$ and permanently connected by a conductor $l'$ with the battery $b$. In front of the disk $i$ (Fig. 6) is mounted a second disk $m$ (Fig. 6) adapted to rotate in front of the disk $i$ and carrying a conducting sleeve $m'$ upon which bears a brush $m^2$ connected to the style $c$ moving over the metallic plate $a$.

The conducting sleeve $m^1$ is bodily connected with a disk $m^3$ provided with a number of metallic pins $m^4$ corresponding with the contacts $j$ of the disk $i$ and placed in front of said contacts. The disk $m^3$ is provided with two recesses or cut out portions $m^5$ so as to be out of contact with two of the pins $m^4$ of the disk $m$; the said two pins are marked $m^6$ and $m^7$ in Fig. 5. To the pin $m^6$, located in the insulating material of the disk $m$ corresponds a second pin $m^8$ facing the metallic ring $l$ arranged in the disk $i$. Consequently, by aid of a conducting yoke $m^9$, for instance, it is possible to secure a direct passage of the current between the ring $l$ and the pin $m^6$ of the rotating disk $m$. Similarly, laterally to the pin $m^7$, which is also insulated from the disk $m^3$, a pin $m^{10}$ is placed in such a manner that the passage of the current from the ring $l$ to the pin $m^7$ is permanently interrupted at the place of pins $m^7$ and $m^{10}$. The current of the battery $b$ passes directly from the conductor $l'$ to the metallic ring $l$ and then to the pin $m^8$, the conducting yoke $m^9$, the pin $m^6$ and the conductors $k$—$k'$ which are connected to the corresponding contact $j$, that is to say to the contact which is in front of the pin $m^6$; the said conductors $k\ k'$ lead to two contacts of the main switch $d$. On the other hand, the current coming from the battery $b$ passes also through the metallic plate $a$, the style $c$, the brush $m^2$, the sleeve $m^1$ and the disk $m^3$ and is then sent by said disk and the pins $m^4$ connected thereto, to the pins $j$ of disk $i$ with which the pins $m^4$ are in contact. From the pins $j$ the current is also conducted by conductors $k\ k'$ to the corresponding contacts of the main switch $d$.

In the construction shown, the electromagnets $e$ are arranged in the same order as in Fig. 2 and it has been assumed that they are gradually displaced so as to lock or unlock the punches in the manner already described.

As in the previous construction it has consequently been admitted that the jacquard possesses a maximum of 448 needles or lifting-wires requiring 448 punches which are successively controlled by sixteen electromagnets. It may be useful to state again that the said sixteen electromagnets have to operate 28 times during their complete displacement. It will be obvious, consequently, that the main switch $d$ which is provided with sixteen contacts corresponding with the sixteen electromagnets, must, for a complete displacement of the electromagnets, send 28 times the current in each of the double contacts $g\ g'$. But as the rotating arm $h$ is put in action by a transmitting gear controlled by the main shaft of the machine, it will be obvious, that said switch arm will rotate also during the back stroke of the electromagnets or, in other words, during the punching of the card. On the other hand, it is necessary that, at the moment the electromagnets have been returned to their original position, the rotating arm $h$ of the main switch $d$ be also returned on the contacts $g\ g'$ corresponding to the first electromagnet of the system. It is consequently necessary that, during the return or back stroke of the electromagnets, the arm $h$ also makes a full number of revolutions. Said condition is secured practically by actuating the arm $h$ by means of a multiply gear so proportionated that, for a complete revolution of the main shaft of the machine, the auxiliary shaft carrying the arm $h$ makes say: 35 revolutions. This being the case, 28 revolutions will be used for the action of the sixteen electromagnets during their forward stroke and 7 revolutions will be effected during the returning or back stroke of the electromagnets during which they are without action in the machine.

Should the auxiliary switch $f$ not be provided, the current coming from the battery $b$ and passing through the metallic plate $a$ and the style $c$, would be sent directly to the switch arm $h$ and would be distributed successively to the several contacts marked 1, 2, 3, ... 15, 16 of the switch $d$ and consequently to the corresponding electromagnets 1, 2, 3, ... 15, 16. The said electromagnets would be actuated in the order indicated with reference to Figs. 2 and 3 and the action would be repeated 28 times for each acting stroke. The conditions already described would be fulfilled and the machine would produce the locking or unlocking of the punches according to the position of the style $c$ over the metallic plate $a$ and neither holes nor blanks would be provided in the card for the binding. The said operating conditions are modified by the operation of the switch $f$. Indeed, it is easy to observe, that in the position shown in Fig. 5 for the switch $f$, the current coming from the battery $b$, after having passed through the metallic plate $a$ and the style $c$, is sent through the brush $m^2$ in the disk $m^3$ and only in six pins $m^4$ and six contacts $j$ of the switch, consequently in 12 conductors $k\ k'$ as each contact $j$ is connected by two conductors $k\ k'$ to two contacts $g$ of the main switch $d$. The arm $h$, during a revolution will only send the current through the electromagnets which are connected to the contacts $g'$, the corresponding contacts $g$ of which are connected in the switch $f$ by the disk $m^3$ and the brush $m^2$ with the metallic plate $a$. The electromagnets which are connected to the contacts $g^1$, the conductors of which lead to the contacts $j$ in front of the pin $m^7$, will permanently remain without current as said pin $m^7$ is insulated relatively to the battery on account of the recess or cut out portion $m^5$ provided in the disk $m^3$ and in failure of a conducting connection between pins $m^7$ and $m^{10}$, which latter is in contact with the metallic ring $l$. On the other hand, whatever may be the position of the style $c$ over the metallic plate $a$, (that is to say either the style passes over conducting portions or over insulated portions of the metallic plate), the conductors leading to the electromagnets connected to the contacts $g'$ of the switch $d$, the corresponding contacts $g$ of which are connected by the conductors $k\ k'$ to the contact $j$ corresponding to the pin $m^6$—will receive permanently—(and at each passage of arm $h$ over said contacts $g\ g'$) an electric current coming directly from the battery $b$ through the conductor $l'$, the metallic ring $l$, the pin $m^8$ and the connection $m^9$ between said pins $m^8$ and $m^6$.

Fig. 9 shows diagrammatically the binding which is secured by the arrangement shown in Fig. 5. Said binding has a gait over or range of eight threads or any other range corresponding to a multiple or divider of said number of threads as shown by black quadrates and crosses. In said well known binding, (eight leafed tweel) the 1st, 9th, 17th, 25th, etc., of the warp threads must be lowered while the 5th, 13th, 21st, etc., are lifted. In order that the lifting-wires of the jacquard corresponding to the threads which must be lowered cannot be acted upon by the knives of the jacquard, it is necessary to provide in the card corresponding blanks or unperforated parts. During the rotation of the arm $h$, it will be necessary, on passing over the contact $g$ which is marked 1 and over the contact $g$ which is marked 9 and so on, that said arm closes the circuit through the corresponding electromagnets 1 and 9 even if, at that moment, the style $c$ passes over an insulated portion of the metallic plate $a$. This is obtained by placing the disk $m$ in such a position that the recesses or cut out portions $m^5$ correspond with the contacts $j$ to which are connected the conductors $k\ k'$ leading to the contacts 1 and 9 of the switch $d$ and by connecting through connection $m^9$, the pin $m^8$ with pin $m^6$. The same pick requires the lifting of the warp threads which are numbered 5-13, etc., and in order that the jacquard knives act at that time on the corresponding needles and lifting-wires, it is necessary to provide corresponding holes in the card, even if, at that time, the style $c$ is passing over a metallic portion of the plate $a$. Said result is secured by the fact that, when the cut out portion $m^5$ corresponds with the pins $m^4$ in contact with the contact $j$ marked 1-9 in Fig. 5, the second cut out portion $m^5$ is in front of the pin $m^4$ which rests upon the contact $j$ to which are connected the conductors $k$ $k'$ leading to contacts 5-13 of the switch $d$. As, in that case, on account of failure of a connection between pins $m^7$ and $m^{10}$, the current cannot pass in the conductors $k$ $k'$, the corresponding electromagnets 5 and 13 remain without current and, the stop plates 12 being locked, the punches can perforate the card at the desired places, even if, at that moment, the other electromagnets are energized by the current coming from the style $c$ moving over the metallic plate $a$.

The diagram of Fig. 9 shows clearly that the electromagnets which are thus put in or out of circuit, vary at each pick according to the variation of the binding. So, for instance, if for the first pick the electromagnets 1, 9, etc., were connected to the battery while the electromagnets 5, 13, etc., were out of circuit, for the second pick electromagnets 4, 12, etc., must be put in circuit while 8, 16, etc., must be cut out. This is obtained in practice by intermittently rotating the sleeve $m^1$ with the disk $m$. After each number of revolutions of arm $h$ corresponding to one pick (or after 28 complete revolutions in the example described) the disk $m$ of the auxiliary switch $f$ is displaced manually of a quantity corresponding to $\frac{1}{4}$ of a turn in such a manner that the cut out portions $m^5$ together with pins $m^8$ and $m^6$ with the connection $m^9$ and the pins $m^7$ and $m^{10}$ are successively placed in front of the contacts $j$ to which the conductors of the electromagnets 1, 9 and 5, 13 are connected, then in front of the pins to which the conductors of the electromagnets 4, 12 and 8, 16 are connected, then 7, 15 and 3, 11, etc. The said partial rotation of the auxiliary switch $f$ can be produced by any appropriated actuating means, eventually provided with a stop locking the disk $m$ in each of its positions. In each of said positions, the auxiliary switch $f$ provides further, independently of the above stated function, for the distribution of the current in the other electromagnets according to the position of the style $c$ on conducting portions or insulated portions of the metallic plate $a$.

The construction of the auxiliary switch $f$ hereinbefore described is relatively simple on account of the fact that the range of the binding corresponds to the number of electromagnets which are provided in the machine in such a manner that the 17th warp thread for instance can be controlled by the first electromagnet of the system and the 21st by electromagnet No. 5. The conditions of working are somewhat different when the range of the binding does not correspond to a multiple or divider of the number of electromagnets provided in the machine. This is the case, for instance, with the binding shown in Fig. 13 in which the range or gait over the binding is assumed to embrace five threads in such a manner that the electromagnets which must be successively put in or out of circuit are respectively those numbered 1, 6, 11, 16, etc., and 5, 10, 15, 20, etc. In this case it is necessary to combine the auxiliary switch $f$ with a second switch $p$ shown in Figs. 11 and 12.

Switch $f$ is constructed as already described with the difference, however, that it is provided with only 5 pins, three of which are connected to the shunt circuit passing through the metallic plate $a$, said connection being secured by disk $m^3$ and sleeve $m^1$ upon which rests the brush $m^2$. The two other pins are located as in the example of Fig. 5 so as to secure a permanent passage of the current between pins $m^6$ and $m^8$ through the connection $m^9$ and a permanent interruption of the current at pins $m^7$ and $m^{10}$. The switch $p$ is provided with a number of rings $r$ corresponding to the number of pins of switch $f$ (five, in the construction shown) and each of said rings is connected by a conductor $k$ to the corresponding pin of switch $f$. The switch $p$ is further provided with a rim of contact pieces $s$ to which are connected the conductors $t$ leading to the electromagnets $e$ (numbered 1 to 16) after passage through the main switch $d$, already described. Within the rim of contact pieces $s$ rotates a disk $u$ (Fig. 12) carrying a number of contacts $v$ corresponding to the number of rings $r$ and each of which can be put in contact with the corresponding ring $r$ by aid of a brush $v^1$ and can bear, during the rotation, by aid of a blade $v^2$ upon the rim of contact pieces $s$.

It is easy to understand that, should the switch $p$ not be provided, the required distribution of current could not be secured. Indeed, referring to the position shown in Fig. 10 for switch $f$, it will be seen that the conductor corresponding to the electromagnet No. 1 is permanently connected to the battery $b$ through the connection $m^9$. In such conditions, if the contact $j$ corresponding to pin $m^6$ were connected directly to the contact No. 1 of the main switch $d$, said switch $d$ would evidently, for a complete revolution, send the current in the electromagnet No. 1 only when the arm $h$ would be on the contacts $g$ $g'$ which are marked 1.

On the contrary, by aid of the second auxiliary switch $p$, in which the disk $u$ is displaced from one contact piece $s$ each time the main switch $d$ has advanced from five contact-pieces, the current coming from the battery $b$ and passing permanently through pin $m^6$ will be conducted by the corresponding ring $r$ and the contact piece $v$ successively to the contact pieces $s$ marked 1, 6, 11, 16, 5, etc., in switch $p$ and which are connected to the contacts bearing same number in the main switch $d$. The same will be the case when, after a further pick, the movable part of switch $f$ will be displaced from $\frac{1}{5}$ of a turn. In this case, pin $m^6$ with connection $m^9$ will correspond, for instance with the contact $j$ which is marked 5 in switch $f$ and a current will flow from said contact $j$ through the ring $r$ which is marked 5 in switch $p$ and thence through the corresponding movable contact piece $v$ to the contact pieces of the main switch $d$. During said operation, the regular and normal distribution of the current passing through the metallic plate is effected as previously by the conducting plate or disk $m^3$ coöperating with sleeve $m^1$ and brush $m^2$ while the current is permanently interrupted at the pin $m^7$. It will be observed that the disk $m^3$ can be modified so that the cut-out portions $m^5$ provided in disk $m^3$ correspond either with pins marked 3 and 1, as shown in Fig. 10, or with pins $j$, marked 4 and 1 in switch $f$ in such a manner that two different kinds of windings can be obtained. The windings shown in Fig. 13 are obtained by rotation of the disk $m^3$ of the switch $f$ in one or the other direction.

In Fig. 11, the contact pieces $v^1$, $v^2$ ... (numbered 1, 3, 5, 2, 4) have been indicated as being upon the contacts $s$ which will be put in circuit successively at each pick. In practice, said positions will not be correct and the contact pieces $v^1$ $v^2$ ... must be somewhat displaced to secure the result which is to be attained. Indeed, arm $h$ of switch $d$ rotates, as above stated, at a speed which is five times greater than the speed of disk $u$ of the second auxiliary switch $p$ and, owing to said difference of speed, when arm $h$ has advanced from five contact pieces, the contact $v^1$ $v^2$ (marked 1) of the disk $u$ will have advanced from one contact $s$ and will be on the contact marked 6. The operation will suit consequently for a first revolution of disk $u$ of switch $p$ but it will not be exact, for instance, for the 3rd revolution of switch $p$ (3d pick) at the moment that the contacting arm $v^1$ $v^2$ (marked 3) will be in action as, indeed, for the position of arm $v^1$ $v^2$ (marked 3) which is shown, when arm $h$ will have advanced on pin 5, the disk $u$ will also have received an advance in such a manner that the movable contact $v^1$ $v^2$ (marked 3) will have attained the contact piece $s$ which is marked 10. A similar inexact operation should be produced for the positions of arms $v^1$ $v^2$ which are shown as corresponding to the other contacts, should their exact positions not have been previously corrected as shown in Fig. 14. Said figure shows by the numerals 1, 6, 11, 16, 5, etc., the positions of the pieces of contact $s$ corresponding to the positions of Fig. 11 and by the dotted lines 1, 3, 5, 2, 4, the exact positions of the axis of the contacts $v^1$ $v^2$. In these conditions, on the first revolution of switch $p$, the rotating arm $v^1$ $v^2$ (marked 1) is brought successively in contact with the pieces $s$ (marked 1, 6, 11, etc.,) at the same moment that arm $h$ of the main switch $d$ is upon the corresponding contacts 1, 6, 11 . . . ; on a second revolution of switch $p$, the rotating arm $v^1$ $v^2$ (marked 2) is brought successively in contact with the pieces $s$ marked 3, 8, 13, 2, etc., at the same moment that arm $h$ is upon the corresponding contacts 3, 8, 13, 2, etc., and so on for each contact so as to secure the result stated.

In the above described constructions, the bindings are in the same direction in the ground and in the figure or pattern to be woven. However it may be desirable to produce bindings of different directions in the ground and in the pattern. In order to show the generality of application of the above described machine, a construction of auxiliary switch $f$ will be further described which can be used in such cases and which is adapted to secure the binding shown in Fig. 18 in which said binding has been shown in combination with the pattern produced by the metallic plate $a$.

The switch $f$ (Figs. 15, 16, 17) is provided as in the constructions already described with a disk $i$ carrying 8 pins $j$ (Fig. 16) to which are connected the conductors $k$ $k'$ in the order stated: 6—14; 1—9; 4—12; 7—15; 2—10; 5—13; 8—16; 3—11. On said disk is fixed the metallic ring $l$ permanently connected to the battery $b$ and over the pins $j$ is the disk $m$ which is provided with the pins $m^4$ permanently connected to the sleeve $m^1$ upon which the brush $m^2$ rests. The cut out portion $m^5$ of Fig. 5 is replaced by an insulating piece $w$ covering pin $m^7$ (which is consequently insulated) and carrying the connection $m^9$ for the pins $m^8$, $m^6$. Said connection $m^9$, however, instead of transmitting the current, as in Fig. 5 from the ring $l$ successively to the pins $j$, sends said current to a second set of pins $j^1$ located in plate $i$ and permanently connected with the contacts 11—3; 8—16; 5—13; 2—10, etc., (Fig. 16) of the main switch $d$. Consequently when contacts 11—3 of the main switch $d$ are permanently connected to the battery by connection $m^9$ as shown in Fig. 15, the contacts 6—14 are insulated by the plate $w$ whatever may be the current distribution in the other seven pins $j$. The binding shown by white and black quadrates in Fig. 18 will thus be obtained, notwithstanding the production of the pattern which is shown as an example in said figure, which pattern is due to the distribution of the current passing through brush $m^2$, sleeve $m^1$ and pins $m^4$ after passage through the metallic plate $a$ and the style $c$.

Figure 19:
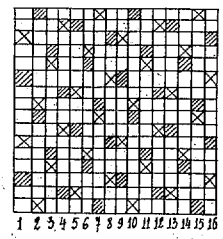

Fig. 19 shows separately, for sake of clearness, the bindings alone according to the notations of Figs. 9 and 13.

The machine as described could obviously be very easily adapted to the production of any other combination of binding which could be required; to this end numerous modifications of details could be made to the machine as described without departing from the scope of the invention.

What I claim is:

1. In a card-punching machine, punches, locking means coöperating with said punches, means for pressing the card to be punched against the locked punches, electromagnets coöperating with the punch-locking-means to unlock the same, a metallic plate carrying a pattern, said plate presenting blank portions and insulated portions, a style adapted to be displaced over said metallic plate, a current distributer; and an electric circuit including the electromagnets, metallic plate, style and current distributer.

2. In a card punching machine, punches, locking means coöperating with said punches, means for pressing the card to be punched against the locked punches, electromagnets adapted to coöperate successively with a number of punch-locking-means to unlock the same, a metallic plate carrying a pattern, said plate presenting blank portions and insulated portions, a style adapted to be displaced over said metallic plate, a current distributer; and an electric circuit including the electromagnets, metallic plate, style and current distributer.

3. In a card punching machine, punches, locking means coöperating with said punches, means for pressing the card to be punched against the locked punches, electromagnets coöperating with the punch-locking-means to unlock the same, means for displacing the said electromagnets in front of the punch-locking means, whereby several of the punch-locking means can be operated by a single electromagnet, a metallic plate carrying a pattern, said plate presenting blank portions and insulated portions, a style adapted to be displaced over said metallic plate, a current distributer, and an electric circuit including the electromagnets, the metallic plate, the style and the current distributer.

4. In a card punching machine, punches, locking means coöperating with said punches, means for pressing the card to be punched with the locked punches, electromagnets coöperating with the punch-locking-means to unlock a number of said punches, a metallic plate carrying a pattern, said plate presenting blank portions and insulated portions according to the pattern, a style adapted to be displaced over said metallic plate, an electric circuit in which the electromagnets, the metallic plate and the style are included and a current distributer included in said electric circuit and distributing a current successively in each of the electromagnets.

5. In a card punching machine, punches, the said punches being arranged in rows, locking means coöperating with said punches, means for pressing the card to be punched against the locked punches, electromagnets coöperating with the punch-locking means to unlock the same, the said electromagnets being arranged in rows and each row comprising a number of electromagnets corresponding to the number of punches in one row, a metallic plate carrying a pattern, said plate presenting blank portions and insulated portions, a style adapted to be displaced over said metallic plate, a current distributer, and an electric circuit including the electromagnets, the metallic plate, the style and the current distributer.

6. In a card punching machine, punches, the said punches being arranged in rows, locking means coöperating with said punches, means for pressing the card to be punched against the locked punches, electromagnets coöperating with the punch-locking-means to unlock the same, the said electromagnets being arranged in rows and each row comprising a number of electromagnets corresponding to the number of punches in one row, means for displacing the said electromagnets in front of the punch-locking-means, whereby each row of electromagnets is adapted to successively operate different rows of punches, a metallic plate carrying a pattern, said plate presenting blank portions and insulated portions according to the pattern, a style adapted to be displaced over said metallic plate, a current distributer and an electric circuit in which the electromagnets, the metallic plate, the style and the current distributer are included.

7. In a card punching machine, punches, the said punches being arranged in rows, locking means coöperating with said punches, means for pressing the card to be punched against the locked punches, electromagnets coöperating with the punch-locking means, the said electromagnets being arranged in rows and each row comprising a number of electromagnets corresponding to the number of punches in one row, means for displacing the said electromagnets in front of the punch-locking means, whereby each row of electromagnets is adapted to successively operate different rows of punches in order to unlock the same, a metallic plate carrying a pattern, said plate presenting blank portions and insulated portions according to the pattern, a style adapted to be displaced over said metallic plate, an electric circuit in which the electromagnets, the metallic plate and the style are included and a current distributer, said distributer comprising a main switch and auxiliary switches distributing the current in the electromagnets in a predetermined order.

8. In a card punching machine, punches, the said punches being arranged in rows, locking means coöperating with said punches, means for pressing the card to be punched against the locked punches, electromagnets coöperating with the punch locking means, the said electromagnets being arranged in rows and each row comprising a number of electromagnets corresponding to the number of punches in one row, means for displacing the said electromagnets in front of the punch-locking-means, whereby each row of electromagnets is adapted to successively operate different rows of punches in order to unlock the same, a metallic plate carrying a pattern, said plate presenting blank portions and insulated portions according to the pattern, a style adapted to be displaced over said metallic plate, an electric circuit in which the electromagnets, the metallic plate and style are included and a current distributer, also included in said circuit and comprising a main switch distributing the current successively in each of the electromagnets and auxiliary switches, whereby certain of the electromagnets are permanently put in circuit while others are permanently cut out of the circuit.

9. In a card punching machine, punches, the said punches being arranged in rows, locking means coöperating with said punches, means for pressing the card to be punched against the locked punches, electromagnets coöperating with the punch locking-means, the said electromagnets being arranged in rows and each row comprising a number of electromagnets corresponding to the number of punches in one row, means for displacing the said electromagnets in front of the punch-locking-means, whereby each row of electromagnets is adapted to successively operate different rows of punches in order to unlock the same, a metallic plate carrying a pattern, said plate presenting blank portions and insulated portions according to the pattern, a style adapted to be displaced over said metallic plate, a battery, an electric circuit in which the electromagnets, the metallic plate, the style and the battery are included and a current distributer also included in said circuit, said distributer comprising a main switch connecting successively each of the electromagnets to the battery and auxiliary switches connecting directly certain of the electromagnets to the battery while preventing permanently the passage of the current of said battery to other electromagnets, whereby blanks and holes are provided in the card for the binding.

10. In a punching machine, punches, the said punches being arranged in rows, locking means coöperating with said punches, means for pressing the card to be punched against the locked punches, electromagnets coöperating with the punch-locking-means, the said electromagnets being arranged in rows, and each row comprising a number of electromagnets corresponding to the number of punches in one row, means for displacing the said electromagnets in front of the punch-locking-means, whereby each row of electromagnets is adapted to successively operate different rows of punches in order to unlock the same, a metallic plate carrying a pattern, said plate presenting blank portions and insulated portions, a style adapted to be displaced over said metallic plate, a battery, an electric circuit in which the electromagnets, the metallic plate, the style and the battery are included and a current distributer also included in said circuit, said distributer comprising a main switch and auxiliary switches, the main switch being adapted to successively send the current of the battery in the electromagnets in each of their positions in front of the locking means corresponding to a row of punches while the auxiliary switches modify the action of the main switch for certain of the electromagnets, whereby the blanks and holes required for the binding are provided in the card.

11. In a punching machine, punches, the said punches being arranged in rows, locking means coöperating with said punches, electromagnets coöperating with the punch-locking-means, the said electromagnets being arranged in rows and each row comprising a number of electromagnets corresponding to the number of punches in one row, means for displacing the said electromagnets with a uniform speed in front of the punch-locking-means, whereby each row of electromagnets is adapted to succesively operate different rows of punches, a table over which the card to be punched is conducted, means for giving said table an up and down movement, whereby the card is pressed against the locked punches during the return of the electromagnets to their original position, a metallic plate carrying a pattern, said plate presenting blank portions and insulated portions, a style adapted to be displaced over said metallic plate, a battery, an electric circuit in which the electromagnets, the metallic plate, the style and the battery are included and current distributing means, also included in said circuit, whereby the punch-locking-means are unlocked successively according to the blank portions of the metallic plate over which the style is passing while certain of the punch-locking means remain locked or are specially unlocked for the binding.

In testimony whereof I have signed my name to this specification in the presence of two subscribing witnesses.

PIETER MATTHIJSSEN.

Witnesses:
 GEORGE BEDE,
 GREGORY PHELAN.